(12) United States Patent
McElroy et al.

(10) Patent No.: US 9,764,263 B2
(45) Date of Patent: Sep. 19, 2017

(54) FILTER ELEMENT

(71) Applicant: Caterpillar Inc., Peoria, IL (US)

(72) Inventors: Mark Andrew McElroy, Peoria, IL (US); Mark Taylor Allott, Mapleton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/776,134

(22) Filed: Feb. 25, 2013

(65) Prior Publication Data

US 2013/0228504 A1  Sep. 5, 2013

Related U.S. Application Data

(60) Provisional application No. 61/605,569, filed on Mar. 1, 2012.

(51) Int. Cl.
| | | |
|---|---|---|
| *B01D 29/00* | (2006.01) | |
| *B01D 35/30* | (2006.01) | |
| *B01D 27/08* | (2006.01) | |
| *B01D 35/147* | (2006.01) | |
| *B01D 29/21* | (2006.01) | |

(52) U.S. Cl.
CPC ........... *B01D 35/306* (2013.01); *B01D 27/08* (2013.01); *B01D 29/21* (2013.01); *B01D 35/147* (2013.01); *B01D 2201/0415* (2013.01); *B01D 2201/296* (2013.01); *B01D 2201/4046* (2013.01); *B01D 2201/4076* (2013.01)

(58) Field of Classification Search
None
See application file for complete search history.

(56) References Cited

U.S. PATENT DOCUMENTS

| | | |
|---|---|---|
| 5,190,651 A | 3/1993 | Spencer et al. |
| 2002/0016242 A1 | 2/2002 | Nozawa et al. |
| 2008/0308481 A1 | 12/2008 | Wieczorek et al. |
| 2009/0001024 A1 | 1/2009 | Porter et al. |
| 2012/0223006 A1* | 9/2012 | Sann et al. ............ 210/441 |

FOREIGN PATENT DOCUMENTS

| | | |
|---|---|---|
| CN | 101588854 | 11/2009 |
| DE | 102009050587 | 4/2011 |
| JP | 2002102609 | 4/2002 |
| JP | 2013508132 | 3/2013 |
| WO | 2008064713 | 6/2008 |

* cited by examiner

*Primary Examiner* — Nam Nguyen
*Assistant Examiner* — Richard Gurtowski
(74) *Attorney, Agent, or Firm* — Finnegan, Henderson, Farabow, Garrett & Dunner, LLP

(57) ABSTRACT

A filter element is disclosed. The filter element may include filter media extending circumferentially around and longitudinally along a longitudinal axis of the filter element. The filter element may also include pilot structure attached to the filter media and configured to locate the filter element. The pilot structure may include an axial cross-section that includes at least one of a noncircular feature or an asymmetrical feature relative to the longitudinal axis.

11 Claims, 18 Drawing Sheets

US 9,764,263 B2

FILTER ELEMENT

RELATED APPLICATIONS

This application claims the benefit of U.S. Provisional Application No. 61/605,569, filed Mar. 1, 2012, the contents of which are expressly incorporated herein by reference.

TECHNICAL FIELD

The present disclosure relates to filter elements and, more particularly, to mounting structure and/or pilot structure used to locate filter elements.

BACKGROUND

Many systems include a filter element for filtering fluid. Such systems may include mounting structure and/or pilot structure for locating the filter element. The mounting and/or pilot structure may serve to locate the filter element during the process of mounting the filter element and/or after the filter element is mounted.

Published U.S. Patent Application No. 2008/0308481 to Wieczorek et al. ("the '481 application") discloses a fluid filter. The fluid filter of the '481 application includes a filter head, a housing, and a filter element with endplates. The filter head includes a center tube that extends into the housing. In the system of the '481 application, the endplates attach to opposite ends of the filter element. The endplates have annular surfaces that engage an outer annular surface of the center tube to locate the filter element on the center tube.

SUMMARY

One disclosed embodiment relates to a filter element. The filter element may include filter media extending circumferentially around and longitudinally along a longitudinal axis of the filter element. The filter element may also include pilot structure attached to the filter media and configured to locate the filter element. The pilot structure may include an axial cross-section that includes at least one of a noncircular feature or an asymmetrical feature relative to the longitudinal axis.

Another embodiment relates to a filter element. The filter element may include filter media extending circumferentially around and longitudinally along a longitudinal axis of the filter element. The filter element may also include pilot structure attached to the filter media and configured to locate the filter element. The pilot structure may include a first projection or recess extending radially relative to the longitudinal axis. The pilot structure may also include a second projection or recess extending radially relative to the longitudinal axis, the second projection or recess being spaced circumferentially about the longitudinal axis from the first projection or recess.

A further disclosed embodiment relates to a filter assembly. The filter assembly may include a filter element. The filter element may include filter media extending circumferentially around and longitudinally along a longitudinal axis of the filter element. The filter element may also include first pilot structure attached to the filter media and configured to locate the filter element. The first pilot structure may include a first axial cross-section that includes at least one of a noncircular feature or an asymmetrical feature relative to the longitudinal axis. The filter assembly may also include mounting structure with second pilot structure including a second axial cross-section that includes at least one of a noncircular feature or an asymmetrical feature aligned with said at least one of a noncircular feature or asymmetrical feature of said first axial cross-section of said first pilot structure.

DETAILED DESCRIPTION

Figure 1A:
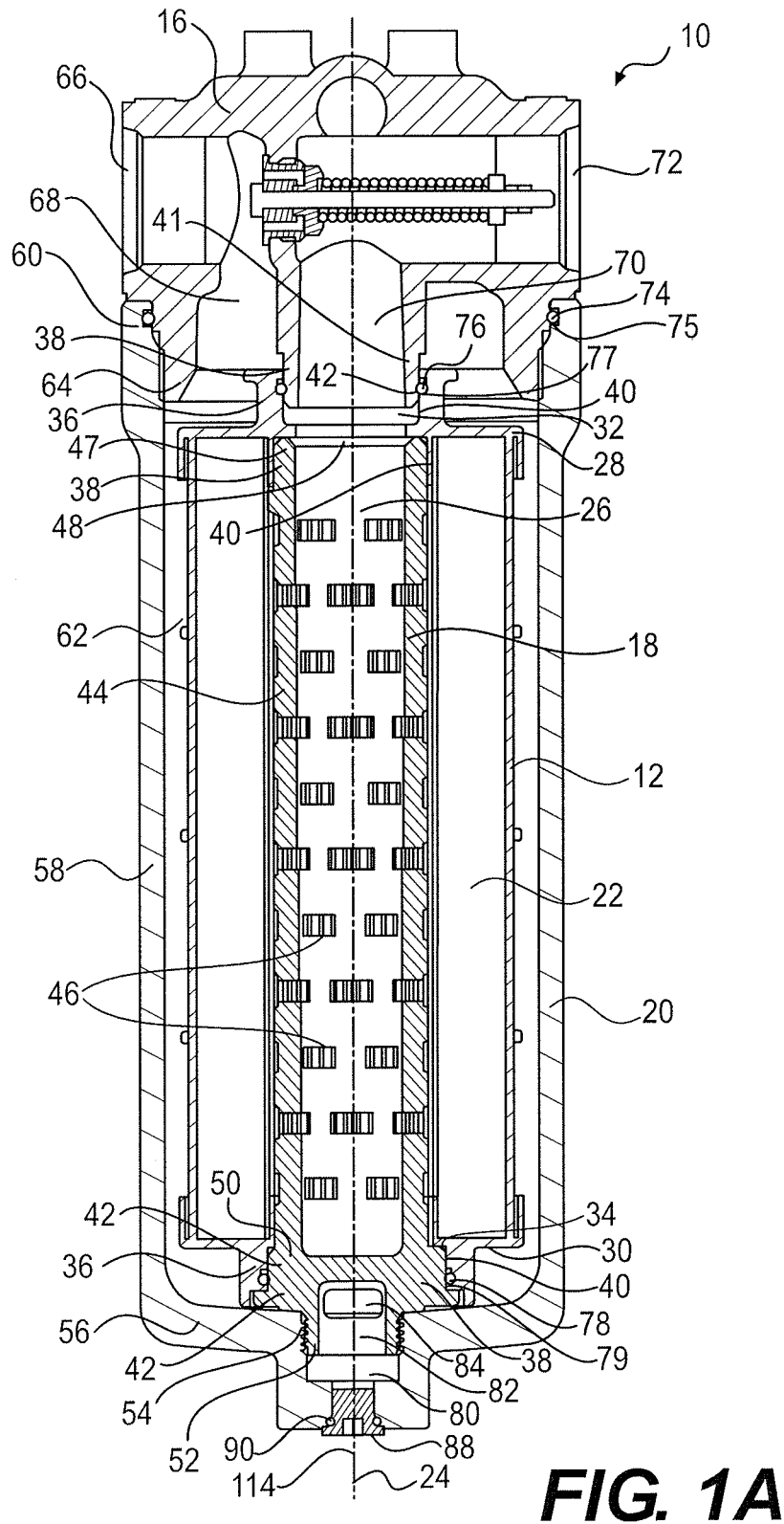
FIG. 1A shows one longitudinal cross-sectional view of one embodiment of a filter assembly according to the present disclosure.
Figure 1B:
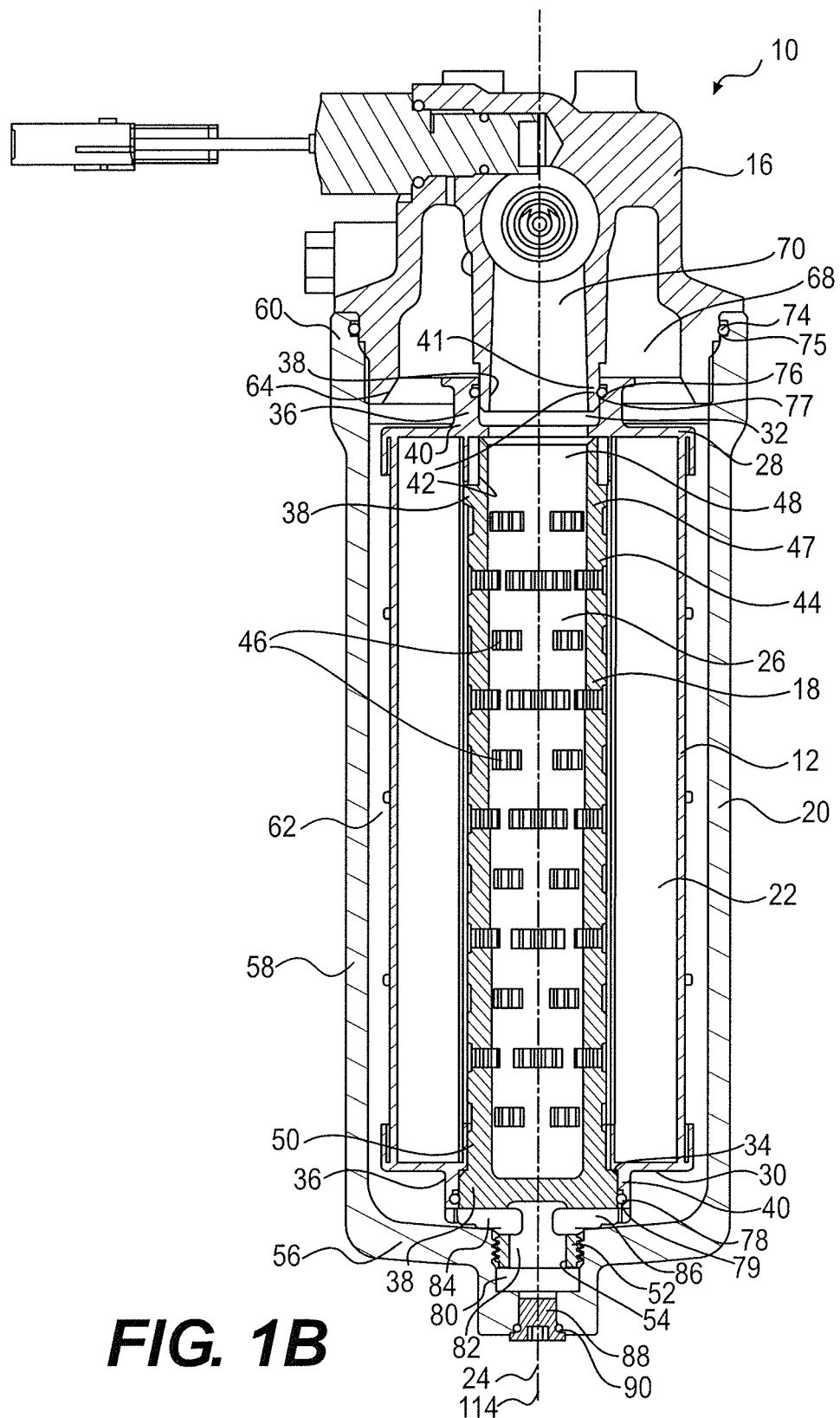
FIG. 1B shows another longitudinal cross-sectional view of the filter assembly of FIG. 1A.

FIGS. 1A and 1B show a filter assembly 10 according to the present disclosure. Filter assembly 10 may include a filter element 12 and structure for supporting filter element 12. The structure for supporting filter element 12 may include, for example, a head 16, a center tube 18, and a canister 20.

Filter element 12 may include filter media 22 extending circumferentially around and longitudinally along a longitudinal axis 24 of filter element 12. Accordingly, a passage 26 may extend along longitudinal axis 24 inside of filter media 22. Filter media 22 may include any material or materials configured to filter fluid flowing through it. In some embodiments, filter media 22 may include cellulose material, spun polyester, micro glass fibers, or any other filtering materials. Filter media 22 may include a single layer of filter material, such as cellulose filter material. Alternatively, filter media 22 may include multiple layers of filter material integrally constructed. For example, filter media 22 may include a base of cellulose material with a coating of melt-blown polyester. Filter media 22 may have various shapes. In some embodiments, filter media 22 may be a sheet of material folded into longitudinal pleats (i.e., pleats whose folds extend parallel to longitudinal axis 24) spaced around longitudinal axis 24.

In addition to filter media 22, filter element 12 may include various other structures. For example, filter element 12 may include endcaps 28, 30 adjacent axial ends of filter media 22. Endcaps 28, 30 may have various shapes. In some embodiments, each endcap 28, 30 may have a generally annular shape, extending around longitudinal axis 24. Filter element 12 may or may not have one or more openings through endcaps 28, 30. In the example shown in the figures, endcaps 28, 30 include central openings 32, 34, respectively, through which longitudinal axis 24 extends. For convenience of discussion, the area adjacent endcap 28 may be considered a top area, and the area adjacent endcap 30 may be considered a bottom area, though the use of these terms is not intended to be limiting regarding the actual vertical orientation of any portion of filter assembly 10.

Endcaps 28, 30 may be constructed of various materials and attached to filter media 22 in various ways. In some embodiments, endcaps 28, 30 may be constructed of a rigid material, such as plastic. Endcaps 28, 30 may be attached directly or indirectly to filter media 22. In some embodiments, axially inner surfaces of endcaps 28, 30 may be attached directly to filter media 22. This may be accomplished by gluing axial end portions of filter media 22 to endcaps 28, 30, embedding axial end portions of filter media 22 in endcaps 28, 30, or by any other suitable means of affixing filter media 22 to endcaps 28, 30.

In addition to filter media 22 and endcaps 28, 30, filter element 12 may also include various other structures and/or components. For example, filter element 12 may include other layers of filter media inside or outside of filter media 22. Similarly, filter element 12 may include various types of reinforcing structures inside or outside of filter media 22 and/or any other layers of filter media that filter element 12 may include.

Filter element 12 may include mounting structure 36 configured to support filter element 12 from mounting structure 38 of other components of filter assembly 10. Mounting structure 36 and mounting structure 38 may include pilot structure 40 and pilot structure 42, respectively, that engage one another to guide and/or locate filter element 12 during the assembly process and/or in the assembled state of filter assembly 10. As discussed in greater detail below, pilot structure 40 and pilot structure 42 may also include provisions for sealing one or more interfaces between them in order to ensure that fluid does not bypass filter media 22 through the interfaces between pilot structure 40 and pilot structure 42. Various portions of filter element 12 may form mounting structure 36 and pilot structure 40. In some embodiments, endcaps 28, 30 may form mounting structure 36 and pilot structure 40.

Mounting structure 38 and pilot structure 42 may include various other components of filter assembly 10. In some embodiments, mounting structure 38 and pilot structure 42 may include portions of center tube 18 and portions of head 16. When filter assembly 10 is in its assembled state as shown in FIGS. 1A and 1B, center tube 18 may extend along longitudinal axis 24 through central opening 34 of endcap 30 and passage 26 into central opening 32 of endcap 28. An annular wall 41 of head 16 may form a portion of pilot structure 42, and the portion of endcap 28 forming central opening 32 may foam a corresponding portion of pilot structure 40. A portion of the inner surface of central opening 32 may register with an outer surface of annular wall 41 to locate endcap 28 relative to head 16. The portions of pilot structure 42 formed on center tube 18 may similarly engage pilot structure 40 formed on endcaps 28, 30 of filter element 12 to locate filter element 12 relative to center tube 18. Details of the construction of pilot structures 40, 42 and how they engage one another will be discussed in greater detail below.

The portion of center tube 18 that sits inside of filter media 22 between endcaps 28, 30 may include a generally cylindrical wall 44 extending circumferentially around and longitudinally along longitudinal axis 24. Wall 44 may include openings 46 through which fluid can pass between the space radially outward of wall 44 and the space radially inward of wall 44. An end 47 of wall 44 may include an opening 48 through which fluid may flow. An opposite end 50 of wall 44 may be sealed off.

Center tube 18 may have various provisions for connecting it to other structures of filter assembly 10. In some embodiments center tube 18 may have a mounting projection 52 that extends outward from closed end 50. Mounting projection 52 may have threads on its outer surface, and such threads may be right-hand or left-hand threads as desired.

Various other components of filter assembly 10 may connect to mounting projection 52 of center tube 18. In some embodiments, canister 20 may include a mounting recess 54 that receives mounting projection 52. Mounting recess 54 may include internal threads that engage the external threads on mounting projection 52. Mounting recess 54 may be formed in an end wall 56 of canister 20.

In addition to end wall 56, canister 20 may include a sidewall 58. End wall 56 may extend generally radially outward relative to longitudinal axis 24. Sidewall 58 may connect to a radially outer portion of end wall 56. Sidewall 58 may extend circumferentially around and longitudinally along longitudinal axis 24 to an open end 60 opposite end wall 56. Sidewall 58 may surround filter element 12 with an annular space 62 between filter media 22 and sidewall 58. The portion of sidewall 58 at open end 60 may engage head 16.

Head 16 may have various provisions for engaging sidewall 58. In some embodiments, head 16 may include an annular wall 64 with an outer surface that engages an inner surface of sidewall 58. In some embodiments, annular wall 64 may include threads (not shown) on its outer surface, and sidewall 58 may include mating threads (not shown) on its inner surface. As shown in FIGS. 1A and 1B, when sidewall 58 is secured to head 16 via these features, canister 20 and head 16 enclose filter element 12 and center tube 18, thereby holding filter assembly 10 together. In exemplary embodiments, the mating threads on annular wall 64 and sidewall 58 may have an opposite thread direction than the mating threads on mounting recess 54 and mounting projection 52. Such an exemplary thread configuration may encourage center tube 18 to remain engaged with mounting recess 54 of canister 20 when canister 20 is removed from head 16. For example, in such embodiments, loosening the connection between the mating threads on annular wall 64 and sidewall 58 may tighten the connection between the mating threads on mounting recess 54 and mounting projection 52.

Head 16 may have provisions for directing fluid into canister 20 to be filtered and directing the filtered fluid out of canister 20. The provisions for directing fluid into canister 20 for filtering may include an inlet port 66 connected to an inlet opening 68. Inlet opening 68 may include, for example, an annular space that extends circumferentially around longitudinal axis 24 between annular wall 41 and annular wall 64. Inlet opening 68 may be in fluid communication with annular space 62 between sidewall 58 and filter media 22. For directing fluid out of canister 20, head 16 may include an outlet opening 70 and an outlet port 72. Outlet opening 70 may include a passage inside of annular wall 41 that extends to outlet port 72. Outlet opening 70 may be in fluid communication with the interior of wall 44 of center tube 18.

With filter assembly 10 constructed and assembled in this manner, fluid may flow from inlet port 66, through filter media 22, to outlet port 72 in the following manner. First, the fluid may flow from inlet port 66 to inlet opening 68, and from there to annular space 62 between sidewall 58 and filter media 22. Then, the fluid may flow radially inward (relative to longitudinal axis 24) through filter media 22 and openings 46 of wall 44 into the space inside of wall 44. From there, the fluid may flow axially within wall 44 of center tube 18 into outlet opening 70 and to outlet port 72.

In order to ensure that fluid flows through filter assembly 10 and filter media 22 in the foregoing manner, it may be necessary to substantially seal certain interfaces of filter assembly 10. For example, it may be necessary to substantially prevent fluid flow through the interface between central opening 34 of endcap 30 and the mating portion of center tube 18. If significant amounts of fluid are allowed to flow through this interface, the fluid could flow from annular space 62, through the interface between central opening 34 and center tube 18, to the inside of filter media 22, without flowing through media 22. This fluid could then flow through openings 46 into the interior of wall 44 and ultimately out of outlet opening 70, without being filtered. It may also be necessary to substantially prevent fluid from flowing through the interface between central opening 32 of endcap 28 and annular wall 41 of head 16. If significant amounts of fluid are allowed to flow through this interface, the fluid could flow from inlet opening 68 directly to outlet opening 70, without flowing through filter media 22. Additionally, it may be necessary to substantially prevent fluid flow through the interface between annular wall 64 and the mating portion of sidewall 58, in order to prevent fluid from leaking out of filter assembly 10 into the surrounding environment.

Filter assembly 10 may include various sealing features that ensure the fluid does not leak from the assembly or bypass filter media 22. For example, a seal 74 between annular wall 64 of head 16 and sidewall 58 of canister 20 may substantially seal fluid in filter assembly 10. Seal 74 may have various configurations, and filter assembly 10 may include various provisions for accommodating seal 74. In some embodiments, seal 74 may be an o-ring seal, and filter assembly 10 may include a circumferential groove 75 for holding and substantially sealingly engaging seal 74. Circumferential groove 75 may be, for example, included on an inside surface of sidewall 58 of canister 20. Additionally or alternatively, filter assembly 10 may include a groove (not shown) on an outer surface of annular wall 64 for holding seal 74.

Additionally, pilot structure 40 and/or pilot structure 42 may include provisions for substantially sealing the interface at the central opening 32 of endcap 28. For example, to prevent fluid from bypassing filter media 22 through central opening 32, a seal 76 between annular wall 41 and the inner surface of central opening 32 of endcap 28 may substantially seal this interface. Seal 76 may have various configurations. In some embodiments, seal 76 may be an o-ring seal. Pilot structure 40 and/or pilot structure 42 may have various provisions for accommodating seal 76. For example, in some embodiments, central opening 32 of endcap 28 may include a circumferential groove 77 configured to hold and substantially sealingly engage seal 76. Additionally or alternatively, annular wall 41 may include a groove (not shown) adjacent central opening 32 for holding and substantially sealingly engaging seal 76.

Figure 2A:
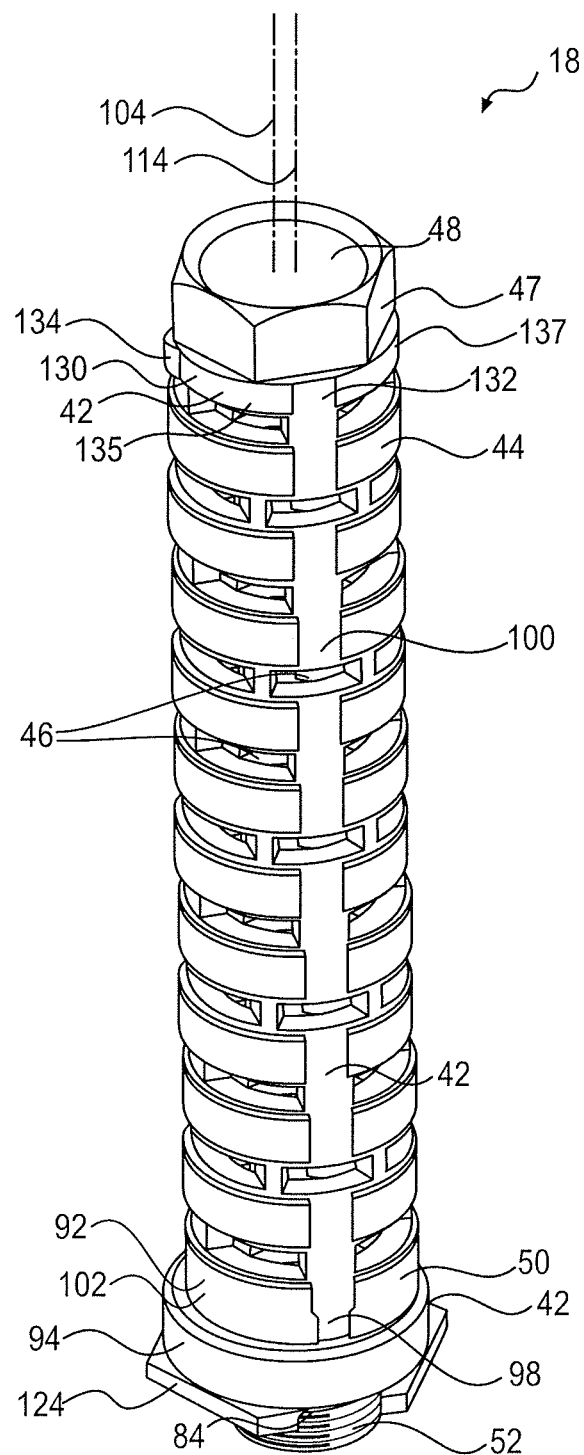
FIG. 2A provides a perspective view of one embodiment of a center tube according the present disclosure.
Figure 3A:
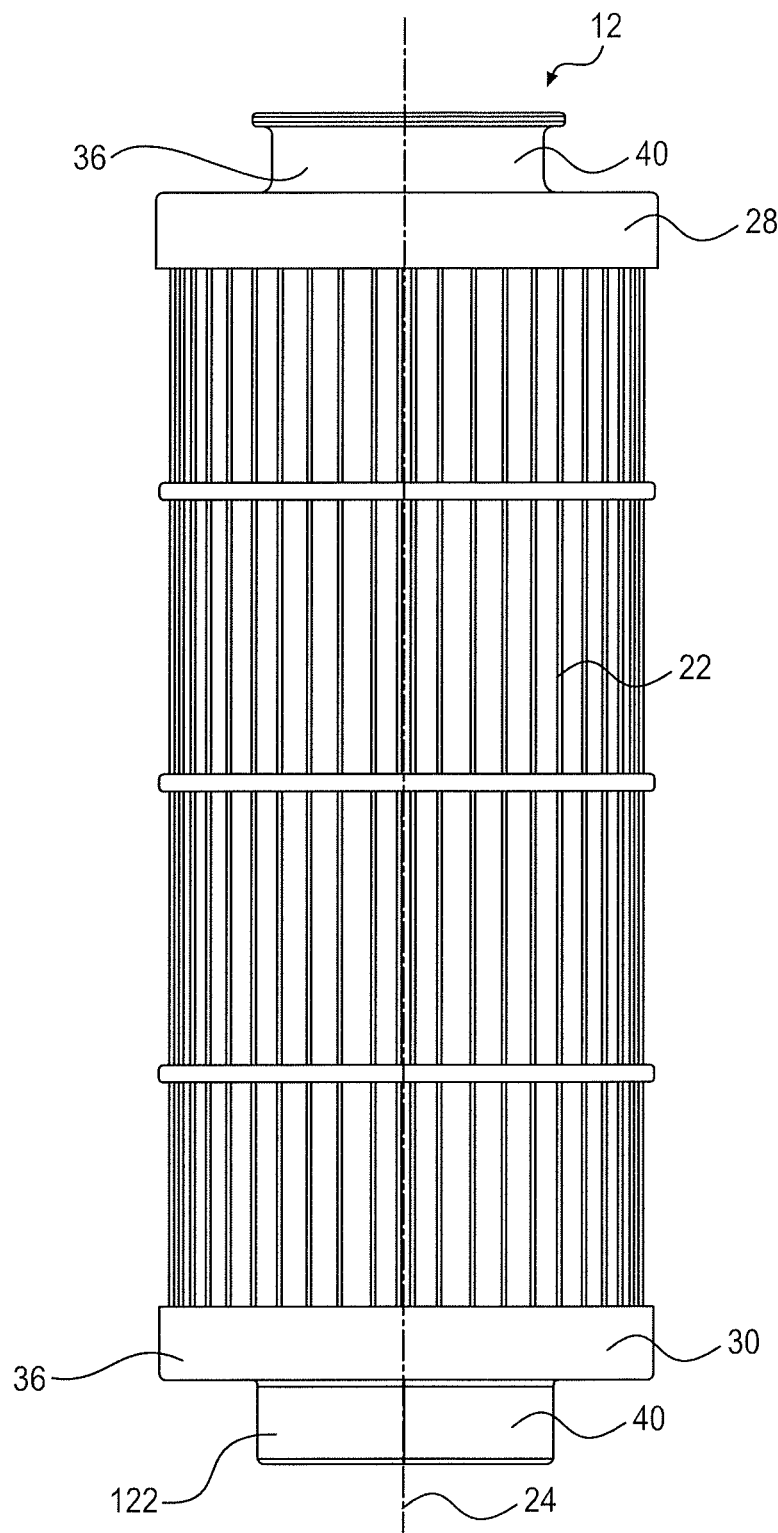
FIG. 3A is a side view of one embodiment of a filter element according to the present disclosure.
Figure 3B:
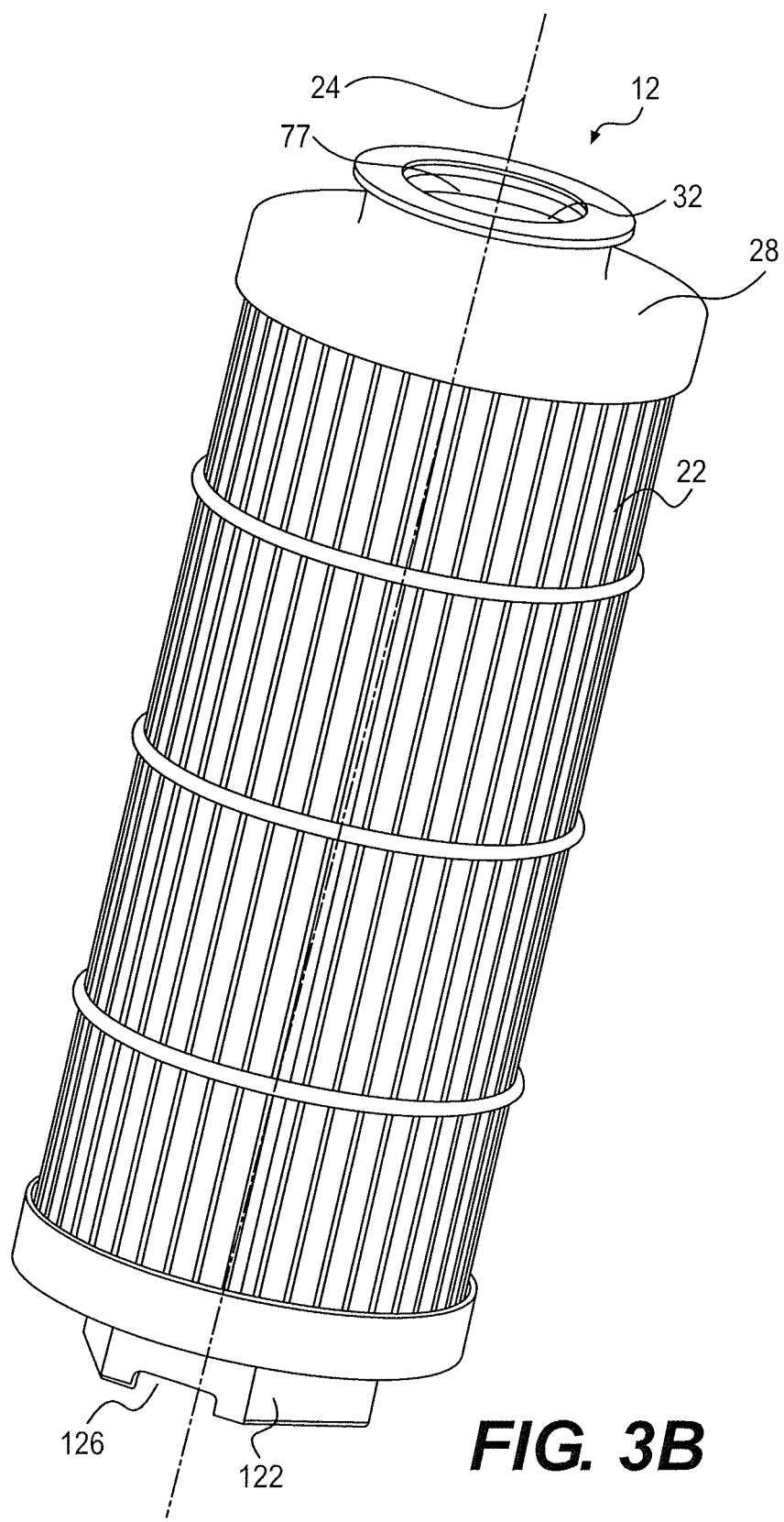
FIG. 3B is a perspective view of the filter element of FIG. 3A from one angle.
Figure 3C:
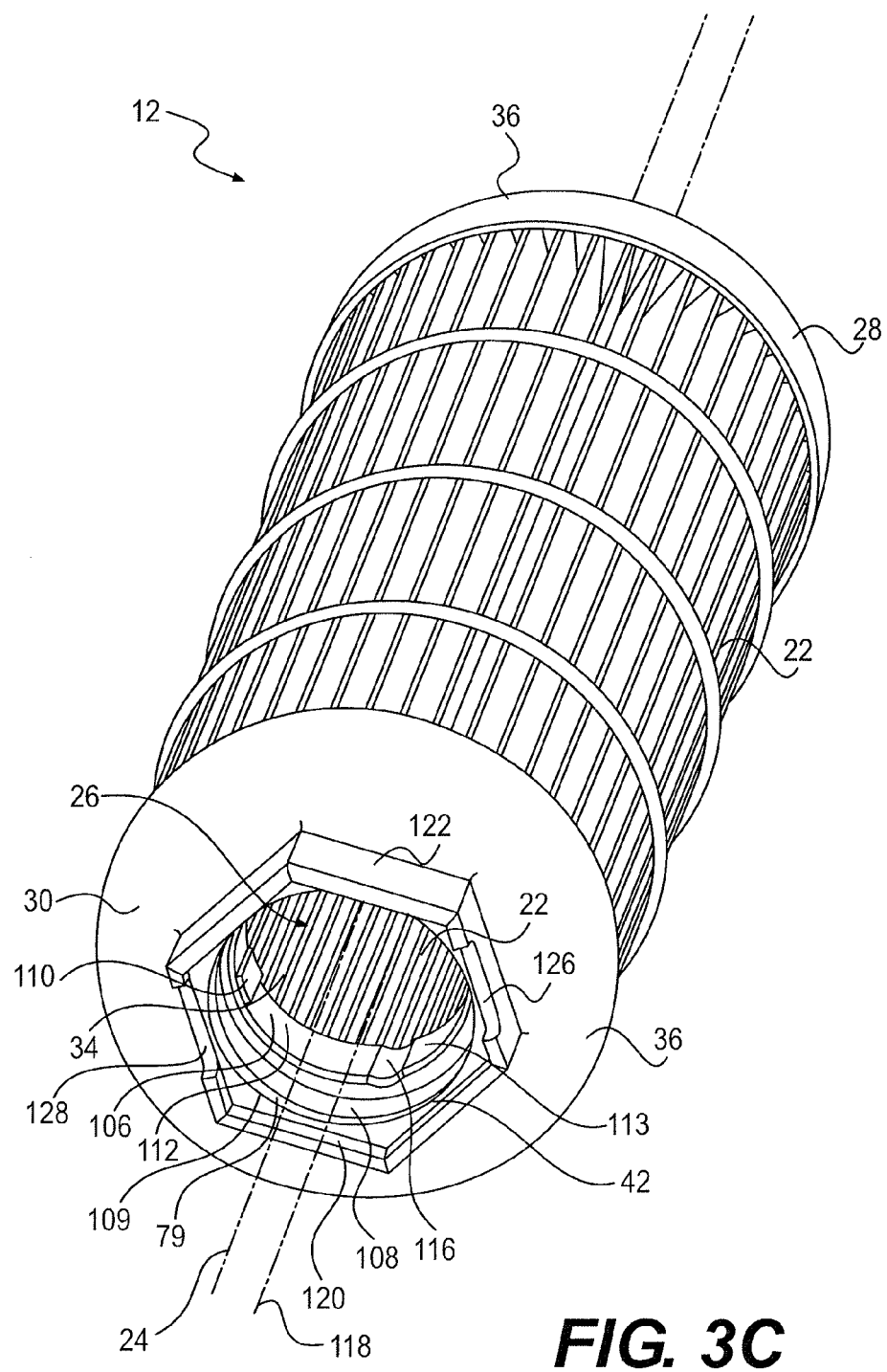
FIG. 3C is a perspective view of the filter element of FIG. 3A from another angle.
Figure 3D:
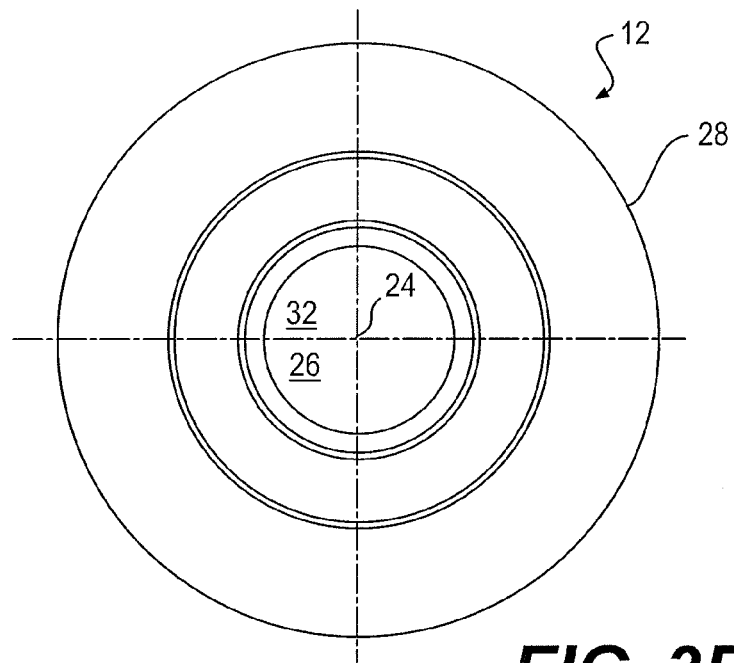
FIG. 3D is an end view of the filter element of FIG. 3A from the top.
Figure 3E:
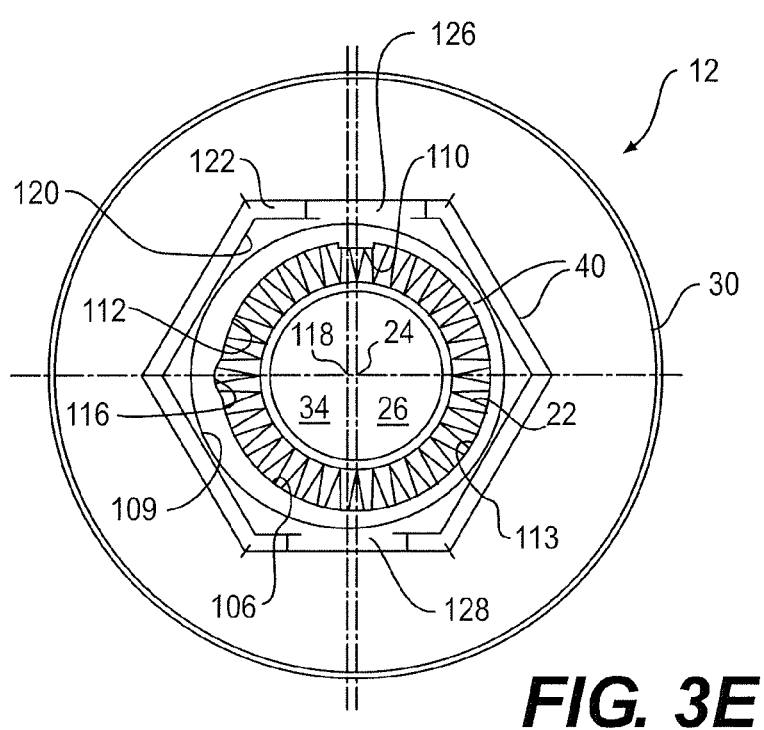
FIG. 3E is an end view of the filter element of FIG. 3A from the bottom.

Filter assembly 10 may include similar provisions for substantially sealing the interface between central opening 34 of endcap 30 and center tube 18. For example, a seal 78 may substantially seal the interface between central opening 34 of endcap 30 and center tube 18, thereby preventing fluid from bypassing filter media 22 by flowing from annular space 62 through central opening 34. Seal 78 may have various configurations. In some embodiments, seal 78 may be an o-ring seal. Pilot structure 40 and/or pilot structure 42 may include various provisions for accommodating seal 78. In some embodiments, to hold seal 78, endcap 32 may include a circumferential groove 79 between a pilot surface 108 extending around central opening 34 and a lip 109 extending around central opening 34. Circumferential groove 79, pilot surface 108, and lip 109 may substantially sealingly engage seal 78. Center tube 18 may have a corresponding pilot surface 94 with smooth surface configured to substantially sealingly engage seal 78. Pilot surface 108 and lip 109 are best shown in FIGS. 3C and 3E. Pilot surface 94 is best shown in FIG. 2A. Thus, pilot surfaces 94, 108 may be configured to engage seal 78 to substantially seal the interface between central opening 34 and center tube 18. The configuration of pilot surfaces 94, 108 for sealing this interface may differ from that shown in the drawings. For example, in some embodiments, circumferential groove 79 may be included in pilot surface 94, and pilot surface 108 may have a smooth configuration for substantially sealingly engaging seal 78. Alternatively, some embodiments may have grooves in both pilot surfaces 94, 108 for substantially sealingly engaging seal 78. Other aspects of pilot surfaces 94, 108 are discussed in greater detail below.

Filter assembly 10 may also have provisions for selectively draining fluid from canister 20. For example, as best shown in FIG. 1B, filter assembly 10 may have provisions for draining fluid from canister 20 via end wall 56. These provisions may include a drain passage 80 extending from a central portion of end wall 56. To allow fluid to reach drain passage 80, mounting projection 52 may have an axial passage 82 that opens into drain passage 80 and radial passages 84, 86 that extend from axial passage 80 to open ends at the sides of center tube 18. Filter assembly 10 may include a removable drain plug 88 closing drain passage 80. Drain plug 88 may be secured, for example, by external threads on drain plug 88 engaged to internal threads in drain passage 80. A seal 90 may seal the interface between drain plug 88 and drain passage 80. Removing drain plug 88 from drain passage 80 may allow fluid to flow from annular space 62, to radial passages 84, 86 in the end of center tube 18, through radial passages 84, 86, into drain passage 80, and out of the open end of drain passage 80.

FIGS. 2A-2D and 3A-3E show center tube 18 and filter element 12 separate from other components of filter assembly 10, providing greater detail on the configuration of the pilot structure 42 foamed on center tube 18 and the pilot structure 40 formed on filter element 12. FIGS. 4A, 4B, 5A-5F, and 6 show center tube 18 and filter element 12 in various stages of assembly to one another, providing greater detail regarding the manner in which pilot structures 40, 42 engage one another during the assembly process and in the assembled state.

As shown in FIGS. 2A-2D, the pilot structure 42 formed on center tube 18 may include a pilot surface 92 and pilot surface 94. Center tube 18 may also include a longitudinal axis 114 extending through the center of wall 44. When filter assembly 10 is assembled, longitudinal axis 114 may extend substantially coincident with longitudinal axis 24. Pilot surfaces 92, 94 may be spaced axially from one another along longitudinal axis 114, with pilot surface 92 closer to open end 47 of wall 44 than pilot surface 94. One or both of pilot surface 92, 94 may have an axial cross-section that includes at least one of a noncircular feature or an asymmetrical feature relative to longitudinal axis 114. As used herein, the term "axial cross-section" used in connection with features of center tube 18 refers to a cross-section perpendicular to longitudinal axis 114.

Figure 2B:
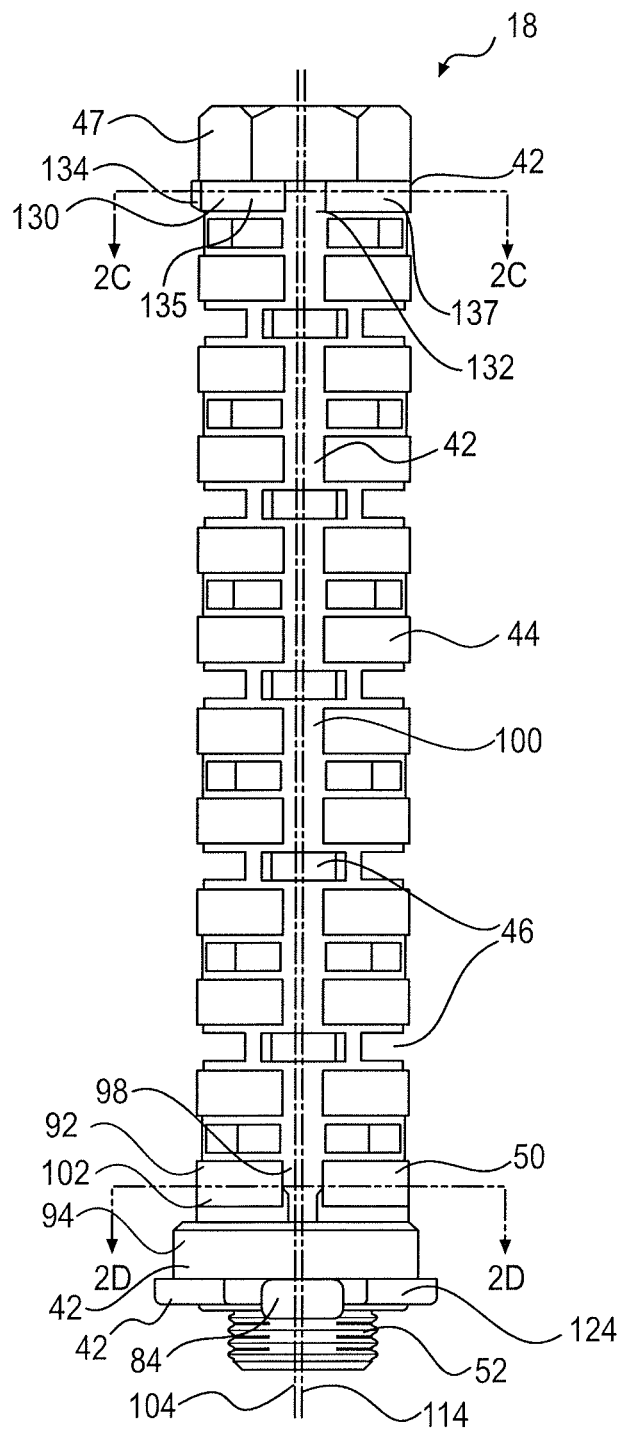
FIG. 2B provides a side view of one embodiment of the center tube shown in FIG. 2A.
Figure 2C:
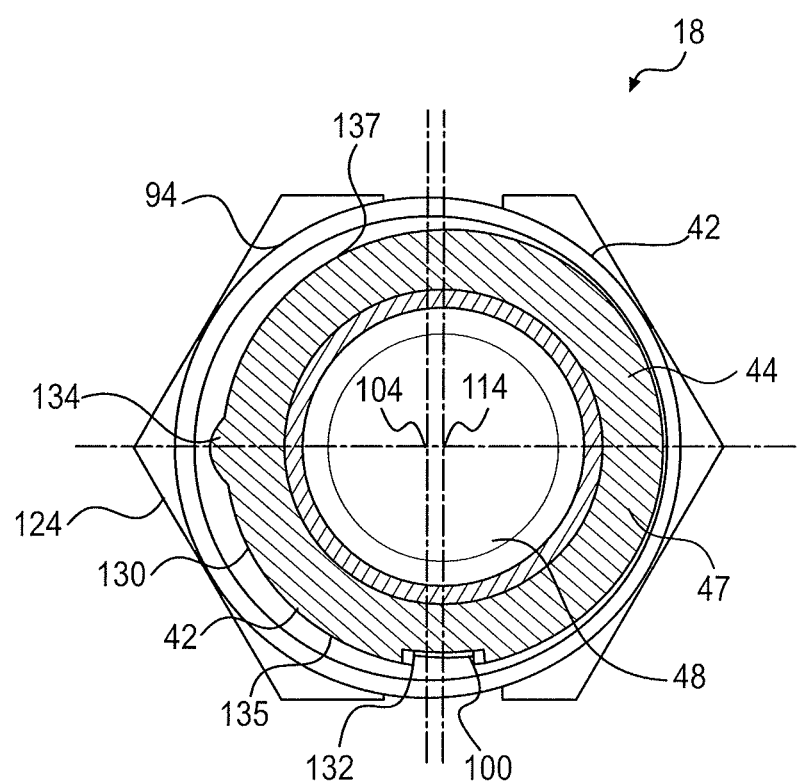
FIG. 2C is an axial cross-sectional view through line 2C-2C of FIG. 2B.
Figure 2D:
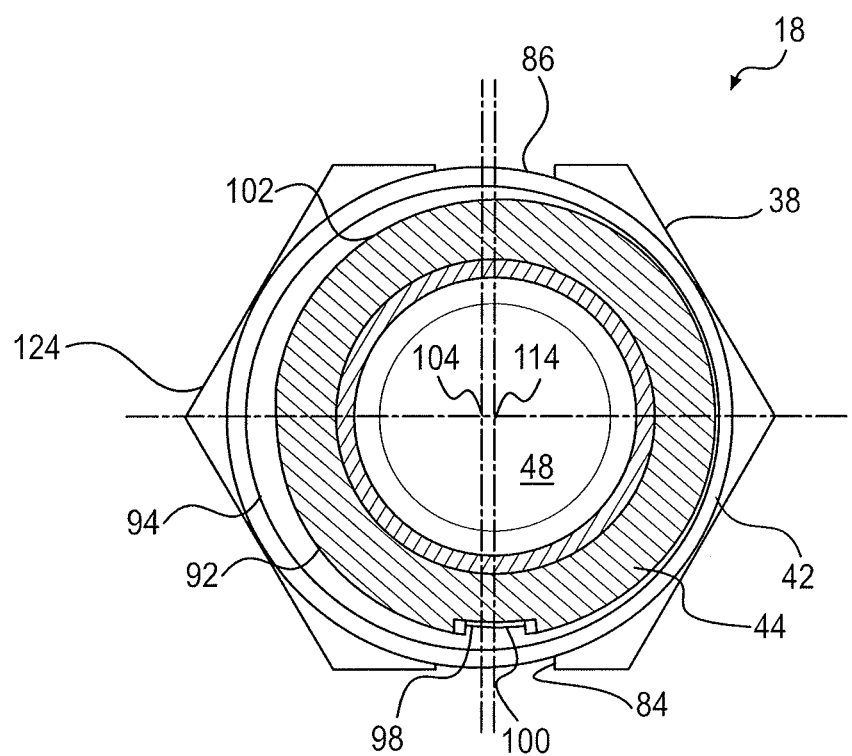
FIG. 2D is an axial cross-sectional view through line 2D-2D of FIG. 2B.

As best shown in FIG. 2D, pilot surface 92 may have a noncircular feature in the form of a recess 98 that extends radially inward relative to longitudinal axis 114. As best shown in FIGS. 2A-2C, recess 98 may form part of a slot 100 running along an outer surface of wall 44 of center tube 18. Slot 100 may extend substantially parallel to longitudinal axis 114. In addition to recess 98, pilot surface 92 may include various other geometric features. For example, pilot surface 92 may include a curved portion 102 extending around longitudinal axis 114 between opposite sides of recess 98. Curved portion 102 may be substantially centered on longitudinal axis 114, such that, in the assembled state of filter assembly 10, pilot surface 92 is generally substantially centered on longitudinal axis 24. In some embodiments, curved portion 102 may have a substantially constant radius of curvature.

Pilot surface 94 may include an asymmetrical feature relative to longitudinal axis 114. For example, as best shown in FIGS. 2B-2D, pilot surface 94 may be centered on an axis 104 radially offset relative to longitudinal axis 114, such that pilot surface 94 is asymmetric relative to longitudinal axis 114. Pilot surface 94 may have various shapes. In some embodiments, pilot surface 94 may have a curved shape, such as a circular shape. As best shown in FIGS. 2C and 2D, pilot surface 94 may be radially larger than pilot surface 92, and each portion of pilot surface 94 may be disposed radially outward of pilot surface 92 relative to longitudinal axis 114. Because of the radial offset of pilot surface 94 relative to longitudinal axis 114, the portion of pilot surface 94 furthest from radial axis 114 may constitute a projection extending radially outward relative to longitudinal axis 114.

The noncircular and/or asymmetrical features of pilot surfaces 92, 94 may have various geometric relationships to one another. As best shown in FIG. 2D, pilot surface 94 may be offset from longitudinal axis 114 in one direction, and recess 98 may extend in another radial direction relative to longitudinal axis 114. In the embodiment shown in FIG. 2D, recess 98 may extend in an angular direction approximately 90 degrees from the direction that pilot surface 94 is offset from longitudinal axis 114. Alternatively, pilot surface 94 and recess 98 may be oriented in other angular directions, including the same direction.

Filter element 12 may have structures corresponding to pilot surfaces 92, 94. For example, as best shown in FIGS. 3C and 3E, endcap 30 may include pilot surfaces 106, 108 adjacent to central opening 34. Pilot surfaces 106, 108 may be configured to mate with pilot surfaces 92, 94, respectively, in the assembled state of filter assembly 10. Pilot surfaces 106, 108 may be longitudinally spaced from one another relative to longitudinal axis 24 of filter element 12. Pilot surface 106 may be disposed axially inward of pilot surface 108 with respect to the outer surface of endcap 30. Like pilot surfaces 92, 94, in some embodiments, one or both of pilot surfaces 106, 108 may have an axial cross-section that includes at least one of a noncircular feature or an asymmetrical feature relative to longitudinal axis 24. As used herein, the term "axial cross-section" used in connection with features of filter element 12 refers to a cross-section perpendicular to longitudinal axis 24.

Pilot surface 106 may include a noncircular feature in the form of a projection 110 that extends radially inward relative to longitudinal axis 24. Projection 110 may have a size and shape configured to fit within recess 98 of pilot surface 92 and slot 100 extending along wall 44 of center tube 18.

In addition to projection 110, pilot surface 106 may include various other geometric features. For example, pilot surface 106 may include a recess 116 extending radially outward relative to longitudinal axis 24. Recess 116 constitutes another noncircular feature of pilot surface 106. The role of recess 116 will be discussed in greater detail below. Pilot surface 106 also may include curved portions 112, 113 extending around longitudinal axis 24 between projection 110 and recess 116. Curved portions 112, 113 may be substantially centered on longitudinal axis 24, such that pilot surface 106 is generally substantially centered on longitudinal axis 24. In some embodiments, curved portions 112, 113 may have substantially constant and equal radii of curvature centered on longitudinal axis 24.

In general, pilot surface 106 of endcap 30 may have a size such that pilot surface 92 of center tube 18 may fit within and adjoin pilot surface 106 when filter element 12 and center tube 18 are assembled to one another. FIG. 5D illustrates how pilot surface 92 and pilot surface 106 may mate with one another in this assembled state. As can be seen in this figure, pilot surface 106 and pilot surface 92 may be sized such that pilot surface 106 will only fit around pilot surface 92 when projection 110 is aligned with and disposed in recess 98.

Similar to pilot surface 94, pilot surface 108 may include an asymmetrical feature relative to longitudinal axis 24. For example, as best shown in FIG. 3E, pilot surface 108 may be centered on an axis 118 radially offset relative to longitudinal axis 24, such that pilot surface 108 is asymmetric relative to longitudinal axis 24. Pilot surface 108 may have various shapes. In some embodiments, pilot surface 108 may have a curved shape, such as a circular shape. Pilot surface 108 may be radially larger than pilot surface 106, and each portion of pilot surface 108 may be disposed radially outward of pilot surface 106 relative to longitudinal axis 24. Because of the radial offset of pilot surface 108 relative to longitudinal axis 24, the portion of pilot surface 108 furthest from radial axis 24 may constitute a projection extending radially outward relative to longitudinal axis 24.

Pilot surface 108 may be configured to mate with pilot surface 94 when pilot surface 106 is mated with pilot surface 92. To allow pilot surface 108 to mate with pilot surface 94, pilot surface 108 may have an axial cross-section large enough to receive pilot surface 94, this is best shown in FIG. 5F, which illustrates pilot surface 94 disposed inside and mated to pilot surface 108 in the assembled state. Additionally, the relationship between pilot surface 108 and projection 110 of endcap 30 may be substantially the same as the relationship between pilot surface 94 and recess 98 of center tube 18. This can be seen by comparing FIG. 3E to FIG. 2D (noting that these features appear flipped relative to one another in these two figures because FIG. 3E views the features from the bottom, whereas FIG. 2D views the features from the top). This may allow pilot surface 108 and projection 110 of endcap 30 to simultaneously mate with pilot surface 94 and recess 98, respectively, of center tube 18, so that filter element 12 may slide fully onto center tube 18, as shown in cross-section in FIG. 5C.

When filter element 12 is fully assembled to center tube 18, seal 78 may be captured within the interface between pilot surface 94 and pilot surface 108 and lip 109. Accordingly, pilot surfaces 94, 108, and lip 109 constitute sealing surfaces for providing a sealed interface between endcap 30 and center tube 18. Thus, the sealing surfaces (pilot surfaces 94, 108, and lip 109) for this interface are offset from longitudinal axes 24, 114 of filter element 12 and center tube 18, respectively, and centered on axes 104, 118, respectively. The seal provided by pilot surfaces 94, 108, lip 109, and seal 78 may be a very significant aspect of the design function of the filter assembly 10, as this seal serves as a barrier between filtered and unfiltered fluid. Seal 78 may be retained in this interface in various ways. As discussed above and shown in FIG. 5C, in some embodiments, a circumferential groove 79 for holding and sealingly engaging seal 78 may be disposed between pilot surface 108 and lip 109.

Endcap 30 may include additional pilot structure 40 adjacent central opening 34, and center tube 18 may include corresponding pilot structure 42. For example, as best shown in FIGS. 3C and 3E, endcap 30 may include a pilot surface 120 extending around longitudinal axis 24 inside of a wall 122. Pilot surface 120 may be disposed axially outward of pilot surface 108. As best shown in FIGS. 2A-2D, center tube 18 may include a pilot surface 124 configured to fit inside and mate with pilot surface 120.

Pilot surfaces 120, 124 may have various shapes. Additionally, pilot surfaces 120, 124 may have various positional relationships to the various axes 24, 104, 114, and 118 of filter assembly 10. In some embodiments, pilot surfaces 120, 124 may have generally hexagonal shapes substantially centered on the same axes 104, 118 as pilot surfaces 94, 108, respectively. Thus, pilot surface 124 may have a plurality of projections (its corners) extending radially relative to axis 104 of pilot surface 94, and pilot surface 120 may have a plurality of corresponding recesses (its corners) extending radially relative to axis 118 of pilot surface 108. Thus, pilot surfaces 120, 124 may be offset relative to longitudinal axes 24, 114 of filter element 12 and center tube 18, respectively. Accordingly, pilot surfaces 120, 124 may constitute asymmetrical features relative to longitudinal axes 24, 114. Additionally, because they have generally hexagonal shapes, pilot surfaces 120, 124 may constitute noncircular features of pilot structure 40. In exemplary embodiments, one or more corners of pilot surfaces 120, 124 may be chamfered and/or otherwise rounded to facilitate assembly and/or mating of center tube 18 with filter element 12. Likewise, in exemplary embodiments, one or more similar corners of a generally hexagonal end 47 of wall 44 may be chamfered and/or otherwise rounded to facilitate assembly and/or mating of center tube 18 with filter element 12. Alternatively, such chamfered and/or otherwise rounded corners may be omitted.

In some embodiments, there may be one or more openings in pilot surfaces 120, 124. For example, as best shown in FIGS. 2A, 2B, 4A, and 6, drain passage 84 may extend through one side of pilot surface 124. Additionally, as best shown in FIGS. 3B, 3C, 4A, and 6, wall 122 and pilot surface 120 may have an opening 126 that aligns with the outer end of drain passage 84 when filter element 12 is fully assembled to center tube 18. Similarly, drain passage 86 may extend through an opposite side of pilot surface 124, and pilot surface 120 and wall 122 may have a corresponding opening 128 that aligns with drain passage 86 when filter element 12 is fully assembled to center tube 18. Openings 126, 128 may allow fluid to flow readily into drain passages 84, 86.

In addition to the pilot structure 42 adjacent end 50 of wall 44, center tube 18 may include pilot structure 42 in other places. For example, the slot 100 extending down the side of wall 44 to recess 98 in pilot surface 92 may constitute part of the pilot structure 42 of center tube 18.

Figure 4A:
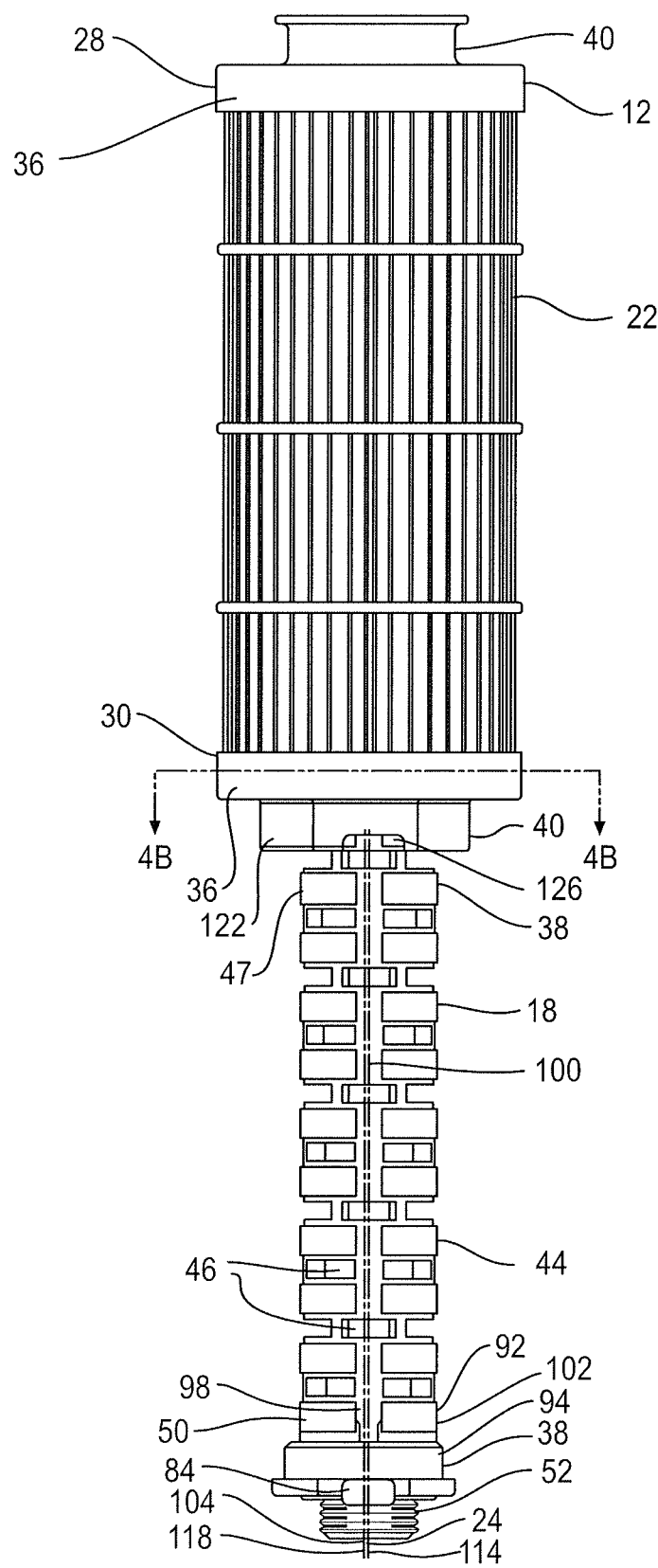
FIG. 4A is a side view of the filter element of FIGS. 3A-3E partially assembled to the center tube of FIGS. 2A-2D.
Figure 4B:
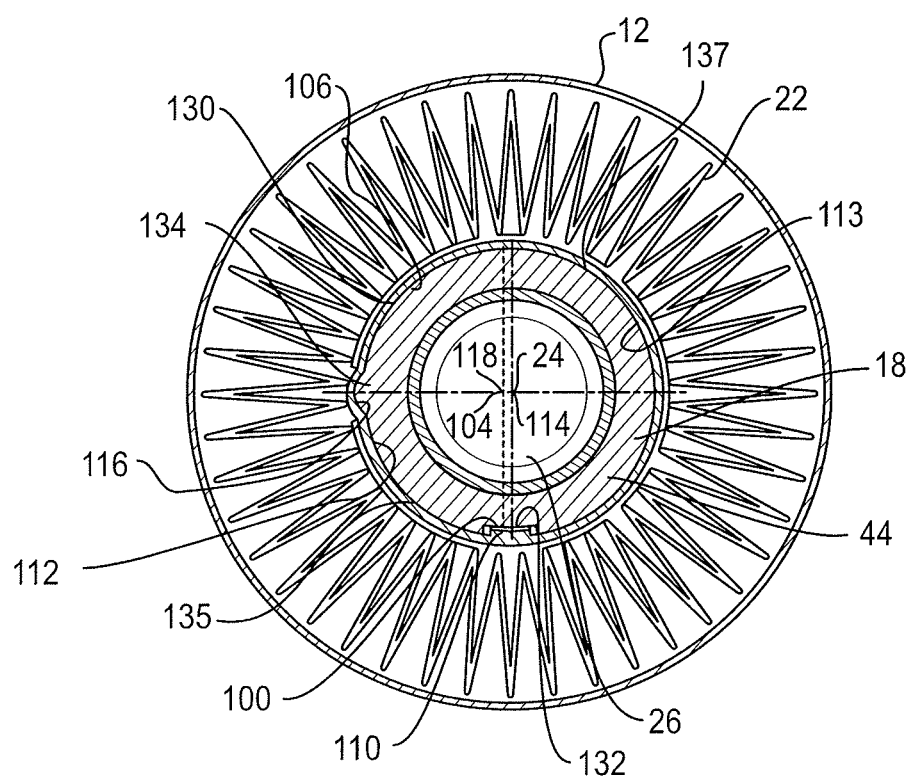
FIG. 4B is an axial cross-sectional view through line 4B-4B of FIG. 4A.

Additionally, as best shown in FIGS. 2A-2C, center tube 18 may include a pilot surface 130 formed on the outside of wall 44 adjacent end 47. Among various other functions, pilot surface 130 may engage pilot surface 106 of endcap 30 when assembly of filter element 12 to center tube 18 is commenced by inserting end 47 of wall 44 into central opening 34 of endcap 30. FIG. 4A is a side view of these components at this stage of assembly, and FIG. 4B is an axial cross-section showing engagement of pilot surface 130 to pilot surface 106 at this stage of the assembly process.

Similar to pilot surfaces 92, 94, pilot surface 130 may have an axial cross-section that includes at least one of a noncircular feature or an asymmetrical feature relative to longitudinal axis 114. For example, pilot surface 130 may include a recess 132 extending radially inward relative to longitudinal axis 114, as well as a projection 134 extending radially outward relative to longitudinal axis 114. Recess 132 may be part of slot 100 extending along the side of wall 44. Like recess 98 in pilot surface 92, recess 132 may be configured to mate with projection 110 on pilot surface 106 of filter endcap 30. In other words, recess 132 may have a size and shape such that projection 110 may fit within recess 132. Similarly, projection 134 may be configured with a size and shape such that projection 134 may fit within recess 116 of pilot surface 106.

The positioning of recess 132 relative to projection 134 may be substantially the same as the positioning of projection 110 relative to recess 116 of pilot surface 106. For example, the circumferential angular spacing between recess 132 and projection 134 may be substantially the same as the angular spacing between projection 110 and recess 116. This may allow recess 132 and projection 134 to simultaneously mate with projection 110 and recess 116, respectively, when pilot surface 106 of endcap 30 is slid over pilot surface 130 of center tube 18. If the circumferential angular spacing between recess 132 and projection 134 differed from the circumferential angular spacing between projection 110 and 116, it would not be possible to simultaneously engage all of these features to one another. This would prevent starting insertion of filter element 12 over center tube 18.

In addition to recess 132 and projection 134, pilot surface 130 may include various other geometric features. For example, pilot surface 130 may include curved portions 135, 137 extending between recess 132 and projection 134. Curved portions 135, 137 of pilot surface 130 may have shapes similar to and slightly smaller than curved portions 112, 113 of pilot surface 106. For example, in embodiments where curved portions 112, 113 have a constant radius of curvature centered on longitudinal axis 24 of filter element 12, curved portions 135, 137 of pilot surface 130 may have a slightly smaller constant radius of curvature centered on longitudinal axis 114 of center tube 18. This may allow curved portions 135, 137 of pilot surface 130 to fit inside and mate with curved portions 112, 113, respectively, of pilot surface 106, as shown in FIG. 4B.

Figure 5A:
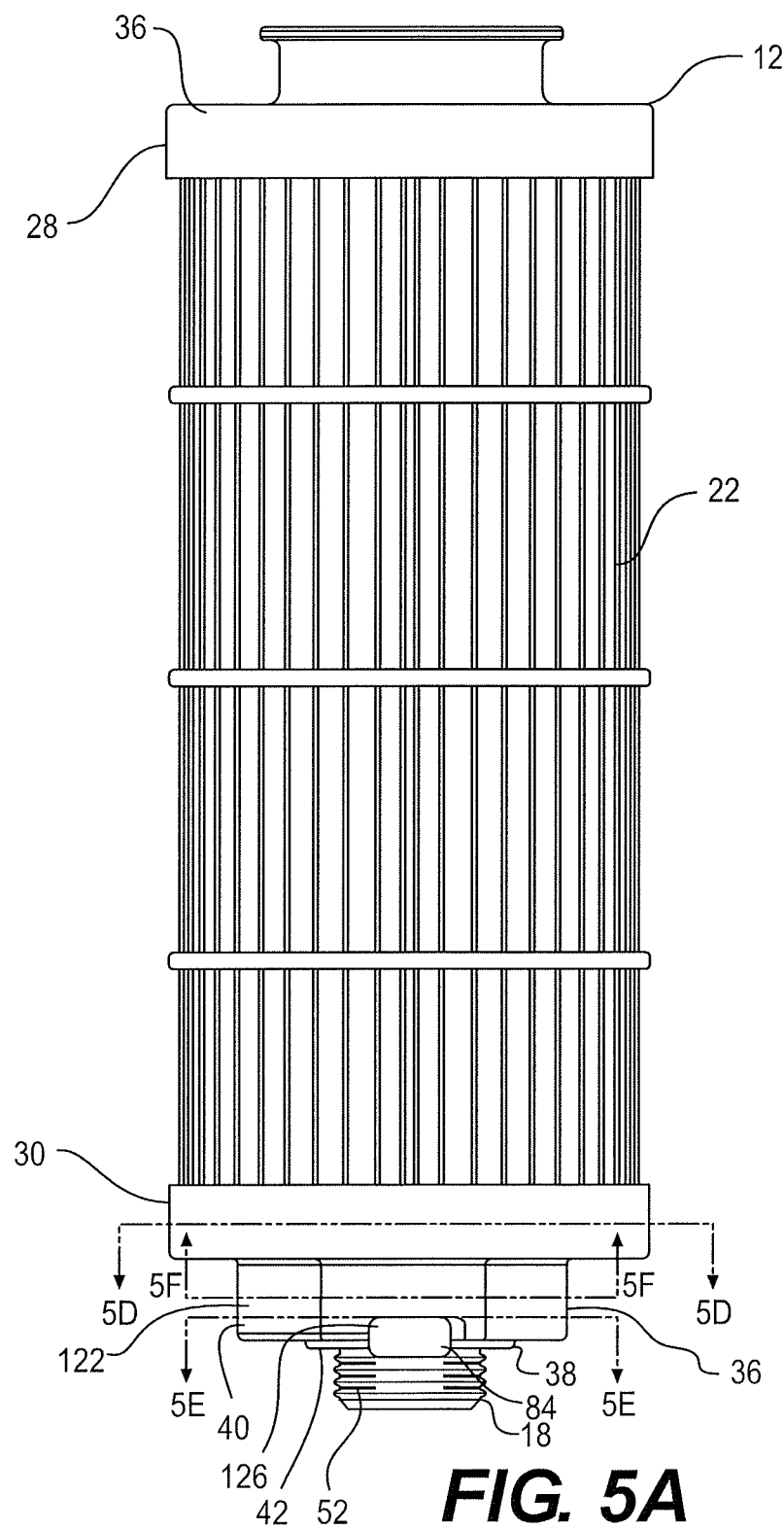
FIG. 5A is a side view of a filter element according to FIGS. 3A-3E fully assembled to the center tube of FIGS. 2A-2D.
Figure 5B:
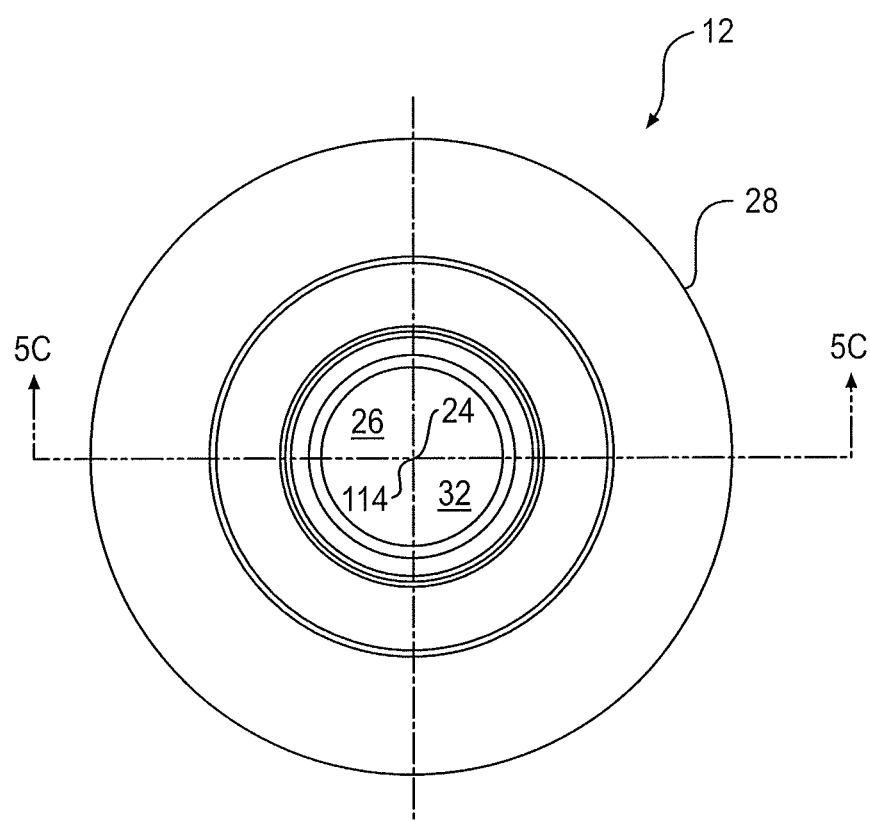
FIG. 5B is an end view from the top of a filter element according to FIGS. 3A-3E fully assembled to the center tube of FIGS. 2A-2D.
Figure 5C:
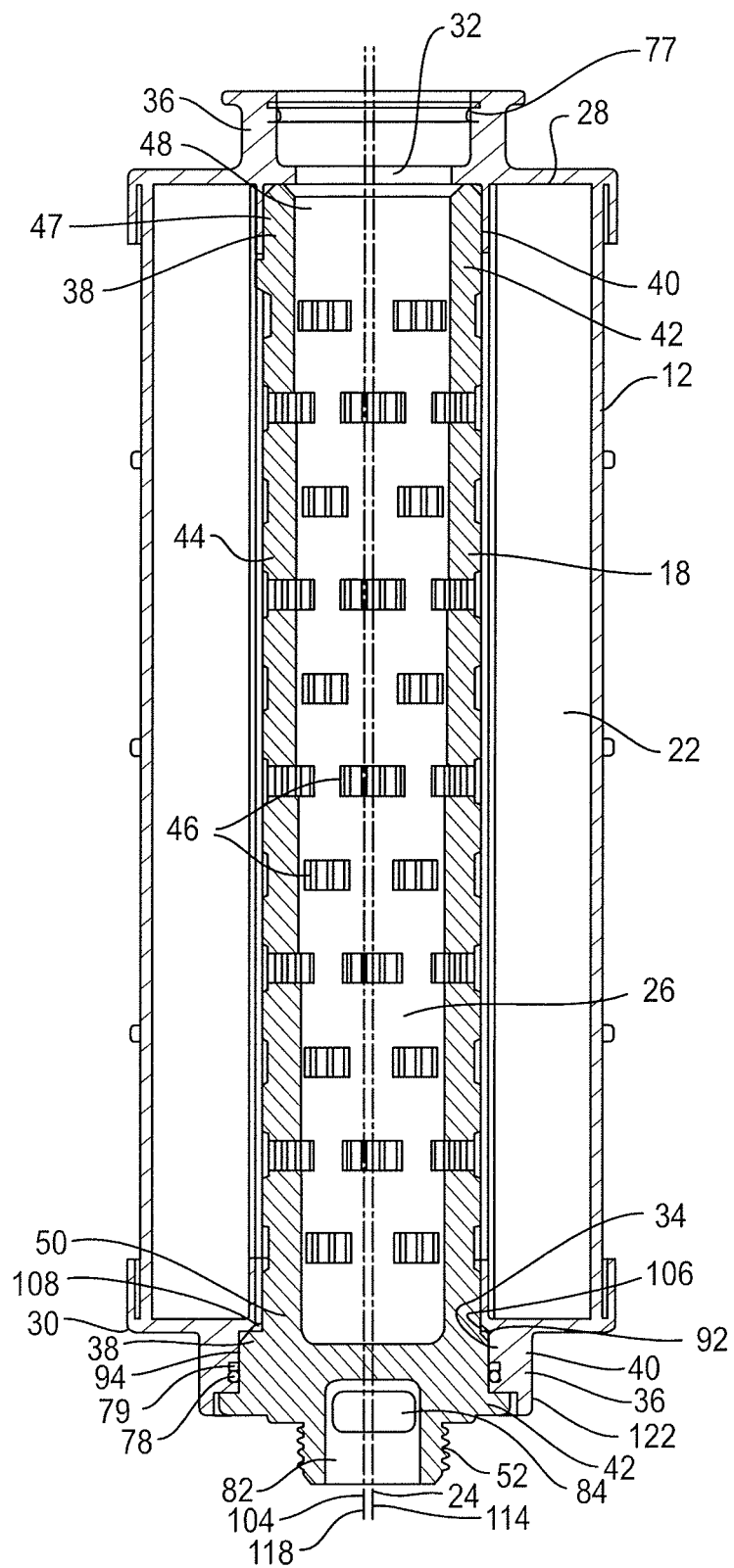
FIG. 5C is a longitudinal cross-sectional view through line 5C-5C of FIG. 5B, showing the filter element of FIGS. 3A-3E fully assembled to the center tube of FIGS. 2A-2D.
Figure 5D:
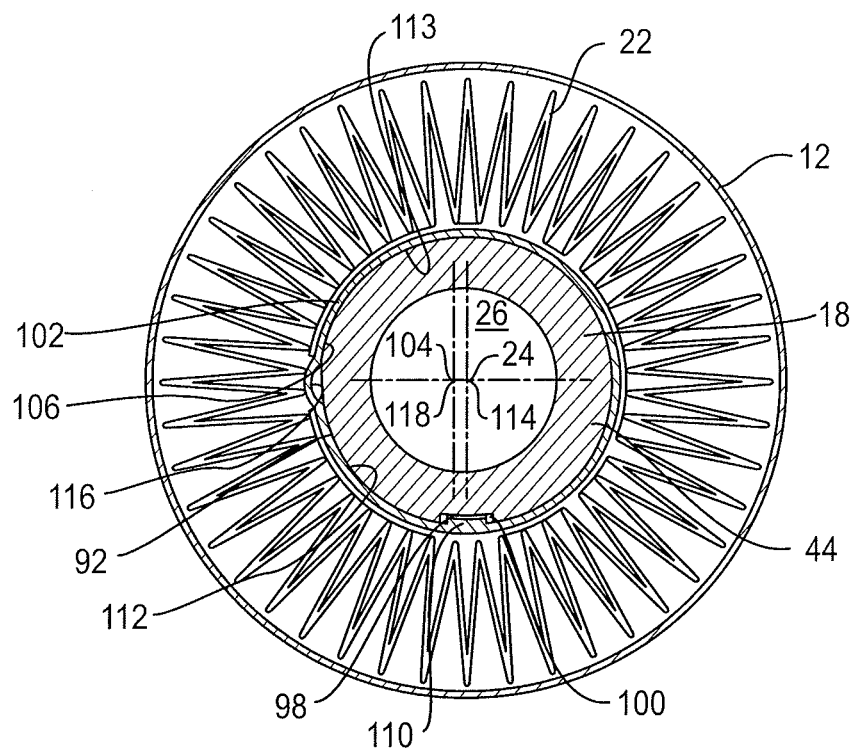
FIG. 5D is an axial cross-sectional view through line 5D-5D of FIG. 5A.
Figure 5E:
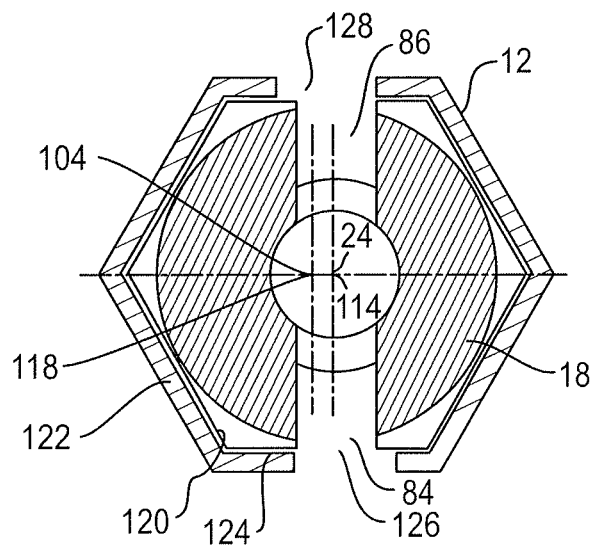
FIG. 5E is an axial cross-sectional view through line 5E-5E of FIG. 5A.
Figure 5F:
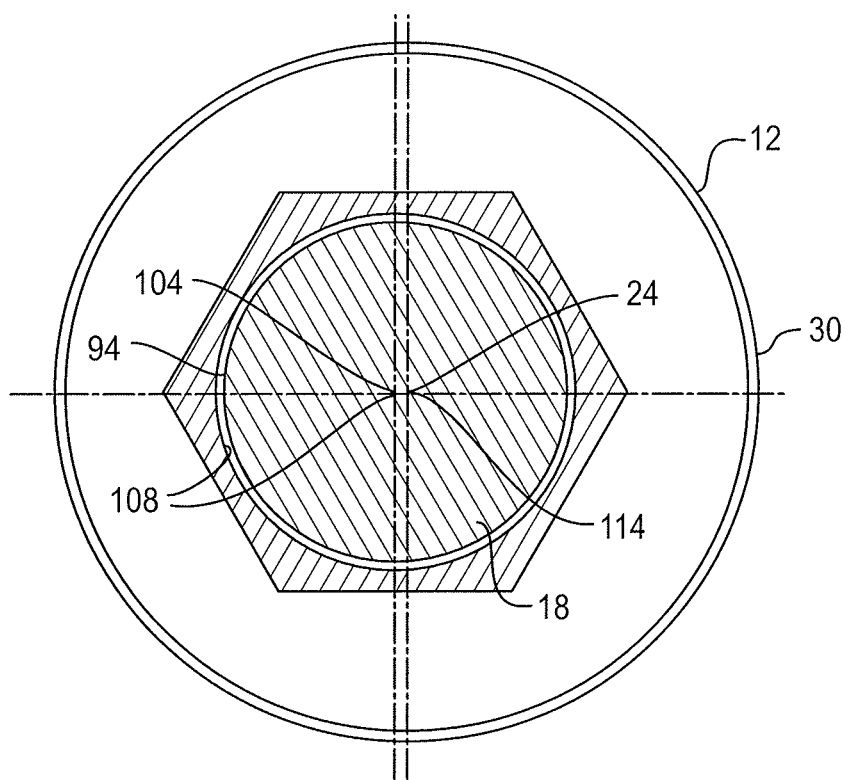
FIG. 5F is an axial cross-sectional view through line 5F-5F of FIG. 5A.
Figure 6:
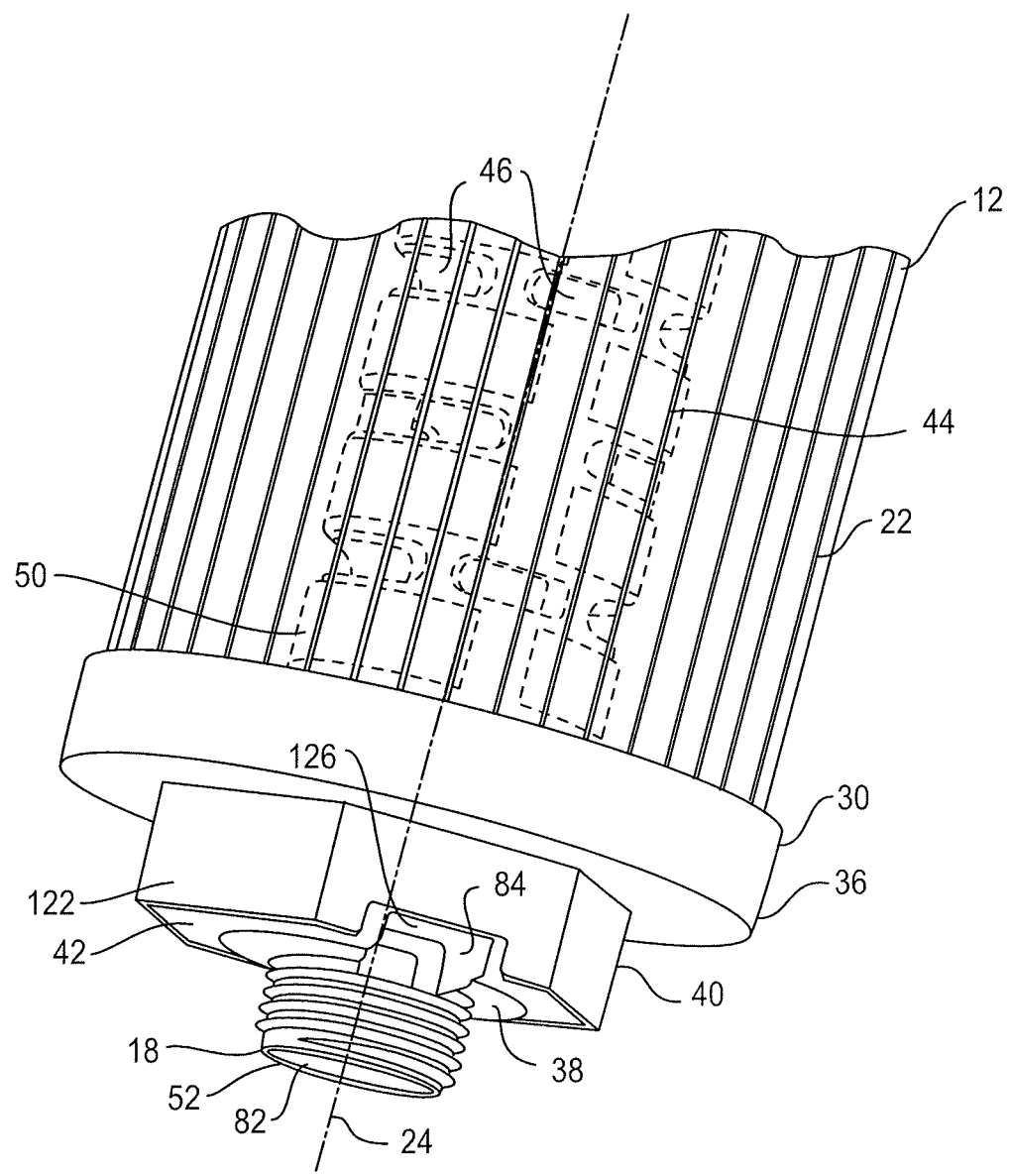
FIG. 6 is a perspective view of a bottom end of the filter element of FIGS. 3A-3E fully assembled to the center tube of FIGS. 2A-2D.

From the state illustrated in FIGS. 4A and 4B assembly of filter element 12 to center tube 18 may be completed by continued sliding of filter element 12 toward end 50 of wall 44 until filter element 12 reaches the position shown in FIGS. 5A and 5C. During this process, projection 110 may slide within slot 100 along the side of wall 44. This may maintain projection 110 in proper alignment with recess 98 in pilot surface 92 of center tube 18, ensuring that these two features will properly engage one another at the end of the assembly motion. Engagement of projection 110 to slot 100 may also maintain offset pilot surface 108 of endcap 30 properly aligned with offset pilot surface 94 of center tube 18, so that these two surfaces may properly engage one another at the end of the assembly motion.

One or more of the components of filter assembly 10 may be part of a family of filter components that have some common features and some different features. For example, each of filter element 12, center tube 18, and canister 20 may be part of a family of components that have similar cross-sections but different lengths. In such embodiments, the different center tubes 18 of the family may, for example, have walls 44 with substantially the same general cross-sectional size but different lengths. Similarly, the different canisters 20 of the family may have sidewalls 58 with substantially the same cross-sectional dimensions but different lengths. Likewise, filter elements 12 in the family may, for example, have endcaps 28, 30 with substantially the same outer diameter and filter media 22 with substantially the same cross-section, but they may have different axial spacing between the endcaps 28, 30 and different lengths of filter media 22. Filter elements 12, center tubes 18, and canisters 20 may have various other combinations of commonalities and differences.

In some embodiments, one difference between different filter elements 12 and center tubes 18 within a family may reside in the pilot structure 40, 42 for each given member of the family. For example, referring to FIG. 4B, some filter elements 12 in the family may have different circumferential angular spacing between projection 110 and recess 116 of pilot surface 92, and different center tubes 18 may have different circumferential angular spacing between recess 132 and projection 134 of pilot surface 130. Whereas the filter element 12 and center tube 18 shown in FIG. 4B may have these features spaced approximately 90 degrees from each other, another paired set of a filter element 12 and center tube 18 of the family may have these features spaced at some other angle, such as 180 degrees. Other differences may also exist between the pilot structure 40, 42 of different filter elements 12 and center tubes 18 within a given family. For example, different members of the family may have different angular orientations between other features, may omit one or more of the pilot features, may include additional pilot features, and/or may have different sizes and/or shapes of certain features.

By using different configurations of pilot structures 40, 42 on different filter elements 12 and center tubes 18 within a given family, it may be possible to ensure that certain filter elements 12 and center tubes 18 within the family can mate with one another and others cannot. The commonalities and differences between the filter elements 12 and center tubes 18 within a family may be controlled in various ways to achieve various objectives. In some embodiments, a family may be designed so that each design of filter element 12 will fit only one design of center tube 18 from the family, and each design of center tube 18 will fit only one design of filter element 12 from the family. Alternatively, a family may be designed with groups of components that are compatible with one another. For example, a family may be designed with filter elements 12 grouped by their axial length and configured such that any filter element 12 of a given length will mate with any center tube 18 of the appropriate length for those filter elements 12. Of course, various other schemes may be used for grouping compatible components within a given family.

Filter assembly 10 and the components thereof are not limited to the configurations shown in the drawings. Filter assembly 10 may include the pilot structures 40, 42 for mating filter element 12 to other portions of filter assembly 10 in different components of the filter assembly 10. For example, in lieu of or in addition to the pilot structure 42 shown in center tube 18, filter assembly 10 may include additional pilot structure 42 in head 16 and/or canister 20. Additionally, the configuration of various other aspects of filter assembly 10 may differ from that shown in the drawings. For instance, center tube 18 may be integrated into filter element 12.

INDUSTRIAL APPLICABILITY

Filter assembly 10 and filter element 12 may have use in any application requiring fluid filtering. The disclosed embodiments of filter assembly 10 and filter element 12 may provide certain advantages. For example, as discussed above, the pilot structures 40, 42 of filter element 12 and the other components of filter assembly 10 may facilitate assembly of the system. Additionally, as noted above, the configuration of the pilot structure 40 of filter element 12 with noncircular and/or asymmetric geometric features may ensure that a given filter element 12 will only assemble to components with pilot structure 42 having compatible geometry. This feature may be used to help prevent installation of incorrect filter elements 12 in a filter assembly 10.

It will be apparent to those skilled in the art that various modifications and variations can be made in the disclosed system and methods without departing from the scope of the disclosure. Other embodiments of the disclosed system and methods will be apparent to those skilled in the art from consideration of the specification and practice of the system and methods disclosed herein. It is intended that the specification and examples be considered as exemplary only, with a true scope of the disclosure being indicated by the following claims and their equivalents.

What is claimed is:

1. A filter element, comprising:
    filter media extending circumferentially around and longitudinally along a longitudinal axis of the filter element; and
    pilot structure attached to the filter media and configured to locate the filter element, the pilot structure including at least three different axial cross-sections spaced axially from each other and each including at least one of a noncircular feature or an asymmetrical feature relative to the longitudinal axis,
    wherein the at least three axial cross-sections include a first pilot surface in a first one of the at least three axial cross-sections, the first pilot surface forming a complete circle centered on an axis parallel to and offset from the longitudinal axis of the filter element;
    wherein the pilot structure further includes a second pilot surface in a second one of the at least three axial cross-sections and spaced axially from the first pilot surface, the second pilot surface being centered on the longitudinal axis of the filter element and including a recess extending radially outward relative to the longitudinal axis of the filter element at a first angular location, and a projection extending radially inward relative to the longitudinal axis of the filter element at a second angular location, and wherein the pilot structure further includes a third pilot surface in a third one of the at least three axial cross-sections and spaced axially from the first and second pilot surfaces, the third pilot surface having a generally hexagonal shape substantially centered on the longitudinal axis of the filter element.

2. The filter element of claim 1, wherein the at least three different axial cross-sections include the first pilot surface configured to substantially sealingly engage a seal.

3. The filter element of claim 1, wherein:

the filter element is part of a family of filter elements having at least one dimension in common with a corresponding dimension of other members of the family of filter elements but having at least one other dimension that differs from a corresponding other dimension of the other members of the family of filter elements; and the pilot structure of the filter element has a configuration differing from a configuration of a corresponding pilot structure of at least one other filter element in the family of filter elements.

4. A filter element, comprising:

filter media extending circumferentially around and longitudinally along a longitudinal axis of the filter element; and pilot structure attached to the filter media and configured to locate the filter element, the pilot structure including at least three different axial cross-sections spaced axially from each other and each including at least one of a noncircular feature or an asymmetrical feature relative to the longitudinal axis, wherein the at least three axial cross-sections include a first pilot surface in a first one of the at least three axial cross-sections, the first pilot surface forming a complete circle centered on an axis parallel to and offset from the longitudinal axis of the filter element;

wherein the pilot structure further includes a second pilot surface in a second one of the at least three axial cross-sections and spaced axially from the first pilot surface, the second pilot surface being centered on the longitudinal axis of the filter element and including a recess extending radially outward relative to the longitudinal axis of the filter element at a first angular location, and a projection extending radially inward relative to the longitudinal axis of the filter element at a second angular location, and wherein the pilot structure further includes a third pilot surface in a third one of the at least three axial cross-sections and spaced axially from the first and second pilot surfaces, the third pilot surface having a generally hexagonal shape substantially centered on the longitudinal axis of the filter element.

5. The filter element of claim 4, further comprising:

an endcap attached adjacent one axial end of the filter media; and wherein the first and second and third pilot surfaces are formed as part of the endcap.

6. The filter element of claim 4, wherein:

the filter element is part of a family of filter elements having at least one dimension in common with a corresponding dimension of other members of the family of filter elements but having at least one other dimension that differs from a corresponding other dimension of the other members of the family of filter elements; and the pilot structure of the filter element has a configuration differing from a configuration of a corresponding pilot structure of at least one other filter element in the family of filter elements.

7. The filter element of claim 4, wherein:

at least the first pilot surface is configured to substantially sealingly engage a seal.

8. A filter assembly, comprising:

a filter element, including filter media extending circumferentially around and longitudinally along a longitudinal axis of the filter element, and first pilot structure attached to the filter media and configured to locate the filter element, the first pilot structure including at least three different axial cross-sections spaced axially from each other and each including at least one of a noncircular feature or an asymmetrical feature relative to the longitudinal axis, wherein the at least three axial cross-sections include a first pilot surface in a first one of the at least three axial cross-sections, the first pilot surface forming a complete circle centered on an axis parallel to and offset from the longitudinal axis of the filter element;

wherein the first pilot structure further includes a second pilot surface in a second one of the at least three axial cross-sections and spaced axially from the first pilot surface, the second pilot surface being centered on the longitudinal axis of the filter element and including a recess extending radially outward relative to the longitudinal axis of the filter element at a first angular location, and a projection extending radially inward relative to the longitudinal axis of the filter element at a second angular location, and wherein the first pilot structure further includes a third pilot surface in a third one of the at least three axial cross-sections and spaced axially from the first and second pilot surfaces, the third pilot surface having a generally hexagonal shape substantially centered on the longitudinal axis of the filter element; and mounting structure with second pilot structure including at least three axial cross-sections, with each of the at least three axial cross-sections of the second pilot structure including a pilot surface configured to mate with a corresponding one of the first, second, or third pilot surfaces of the first pilot structure when the filter element is assembled on the mounting structure.

9. The filter assembly of claim 8, wherein the second pilot structure includes at least a portion of a center tube that extends circumferentially around and longitudinally along the longitudinal axis inside of the filter media.

10. The filter assembly of claim 9, wherein the first pilot structure includes at least a portion of an endcap of the filter element attached adjacent one axial end of the filter media.

11. The filter assembly of claim 8, wherein:

the filter assembly further includes a seal substantially sealingly engaged between a pilot surface of the first pilot structure and a pilot surface of the second pilot structure.

* * * * *